United States Patent [19]
Fairclough

[11] Patent Number: 5,622,375
[45] Date of Patent: Apr. 22, 1997

[54] PUSH-CHAIR

[76] Inventor: Albert T. Fairclough, 49 Blunden Road, Cove, Farnborough, Hants, Great Britain, GU14 8QI

[21] Appl. No.: 307,703
[22] PCT Filed: Jan. 25, 1994
[86] PCT No.: PCT/GB94/00138
 § 371 Date: Nov. 22, 1994
 § 102(e) Date: Nov. 22, 1994
[87] PCT Pub. No.: WO94/16929
 PCT Pub. Date: Aug. 4, 1994
[51] Int. Cl.6 ...................................................... B62B 9/00
[52] U.S. Cl. ........................ 280/642; 280/658; 280/47.38
[58] Field of Search ............................. 280/35, 638, 639, 280/642, 643, 644, 647, 650, 658, 47.19, 47.22, 47.25, 47.26, 47.34, 47.35, 47.36, 47.38, 47.4, 47.41, 648, 649

[56] References Cited

U.S. PATENT DOCUMENTS

| 2,917,316 | 12/1959 | Gill | 280/643 |
| 2,993,702 | 7/1961 | Gill | 280/643 |
| 3,061,328 | 10/1962 | Konar | 280/650 |

FOREIGN PATENT DOCUMENTS 329878  8/1989  European Pat. Off. .

Primary Examiner—Richard M. Camby
Assistant Examiner—Frank Vanaman
Attorney, Agent, or Firm—Lowe, Price, LeBlanc & Becker

[57] ABSTRACT

A push-chair consists of two delta-shaped side frames and connected by cross bars with a seat attached between the side frames, and with wheels at the bottom ends of the side frame bars. A transverse platform is provided at its lower rear, with the rear wheels mounted substantially at the trailing edge of the platform. The seat is forward of the platform, so that a second child can be carried on the platform, in a standing position behind the seat. Alternatively, a shopping bag can be carried vertically on the platform.

6 Claims, 2 Drawing Sheets

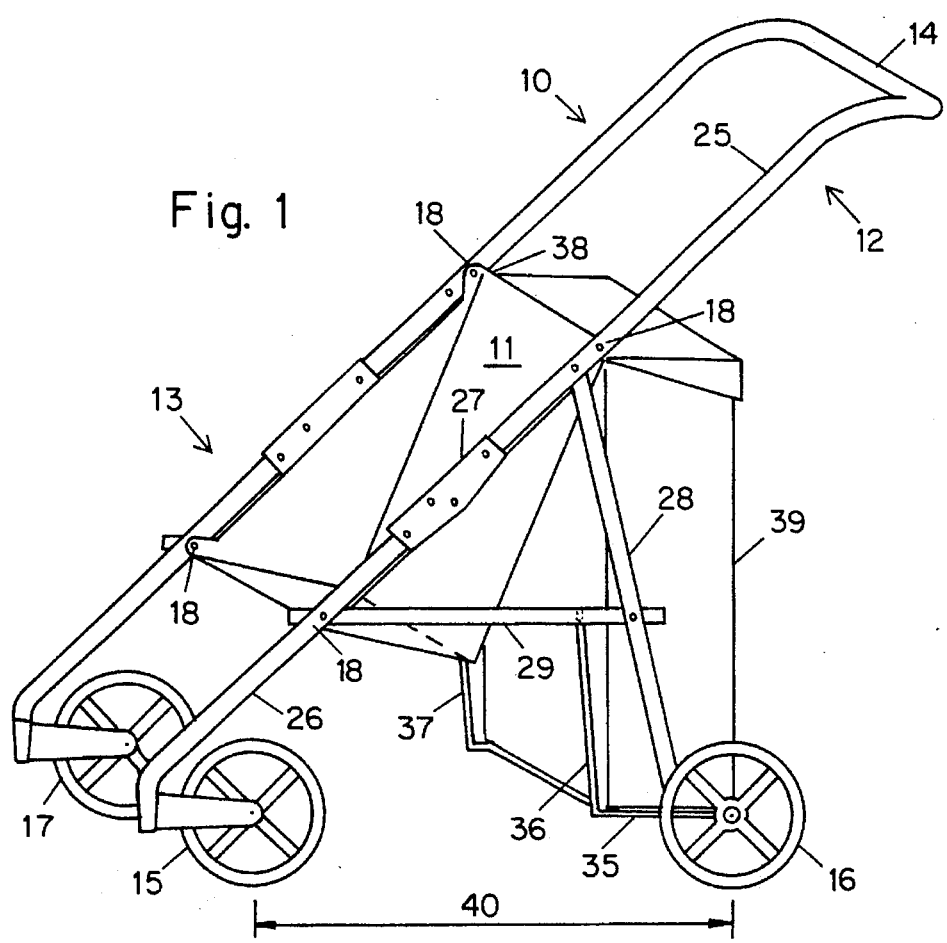
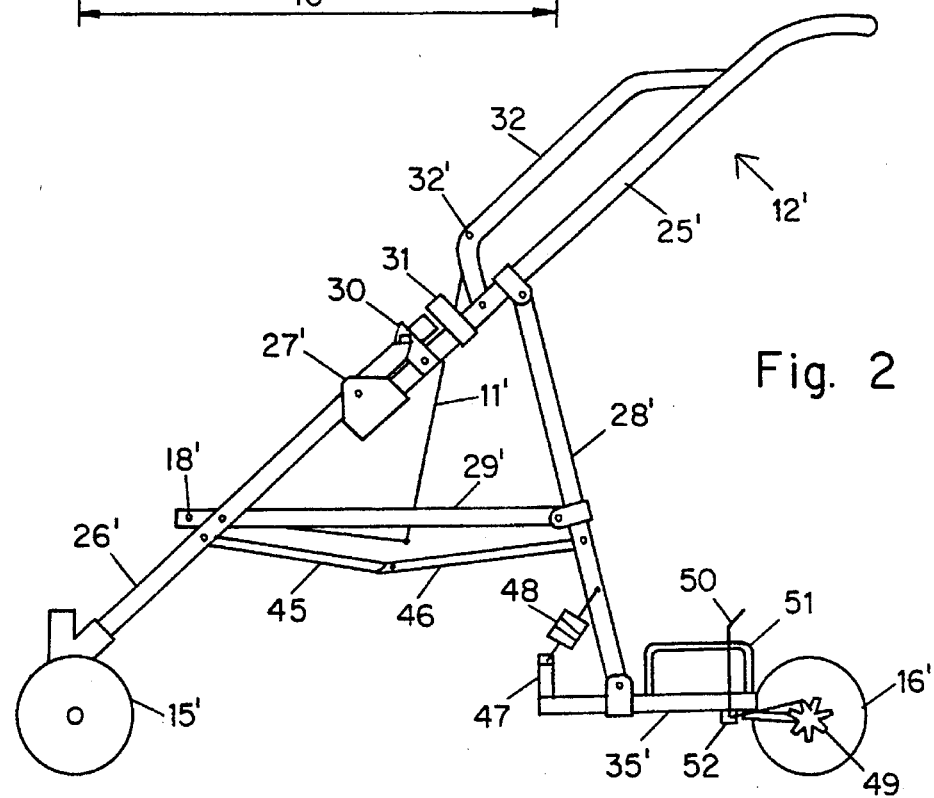

PUSH-CHAIR

The present invention relates to perambulators or push-chairs, primarily of the modern type also known as baby buggies.

The standard push-chair of the baby buggy type consists of framework on which a seat is suspended, the framework consisting of a pair of side frames of delta shape stabilized and held together by cross-bars and with two small diameter wheels at the lower corners of each side frame. The side frames are normally hinged so that the framework can be folded relatively flat, and may have one or more arms extended (e.g. to provide a push-bar or handle at a convenient height). The seat may be formed of canvas or similar material or may be a moulding of plastics material, having a roughly rectangular base, a roughly rectangular back, and two roughly triangular sides.

There are of course many developments of and variations on this basic design. For example, the cross-bars may be hinged to allow the chair to be folded more compactly; there may be a hood or cover; the seat suspension may be adjustable to allow the seat to be mounted in forward, reverse, and/or flat positions; a tray may be provided beneath the seat, to carry shopping purchases; and various braking arrangements may be provided; and various locking arrangements may be provided to minimize the risk of collapse when the chair is unfolded and in use.

Also, each of the two front wheels may actually be a pair of wheel discs mounted one on each side of a vertical shaft which is pivotally mounted on the side frame, to allow easier steering of the chair, and similarly each of the two rear wheels may actually be a pair of wheel discs mounted one on each side of a vertical shaft (though for the rear wheels, the vertical shaft may not be pivoted).

The chair may also be a multiple chair. It may have seats mounted one behind the other between the two side frames (the rear seat usually being higher than the front one); alternatively, it may have 2 (or even more) seats side by side (such chairs usually have a frame, matching the side frames, between each adjacent pair of seats).

The push-chair as described so far is intended to carry a single child. Occasionally, however, there is a need to carry two children. There are two ways of extending the basic design to achieve this. One is to double the width of the chair and provide two seats side by side in the framework (a third, central side frame may be included if desired); the other is to enlarge the size of the side frames and mount two seats one above and behind the other on the framework.

The main object of the present invention is to provide a novel form of push-chair which is capable of carrying a second child.

According to the present invention there is provided a push-chair characterized by a platform provided at its lower rear, with the rear wheels mounted substantially at the trailing edge of the platform, and with seat mounting means for mounting the seat substantially forward of the platform. One child can thus be carried in the seat and a second child can be carried in a standing position on the platform.

The present chair is appreciably less expensive than the known double seat chair designs, since it requires the addition of only a simple platform to the basic single-seat chair design, rather than the addition of a complete second seat.

The present chair is primarily intended for use with two children of different ages, with the older child being old enough to stand for a reasonable length of time. This may well be more convenient than the known double-seat chair designs, which are intended primarily for children of the same age. It is also considerably more convenient to use than the side-by-side double seat design.

It will be realized that the platform of the the present chair may also be used to carry a shopping bag, particularly a bag of upright form, and a suitable bag may be provided with the present chair. If desired, however, a net or tray may also be provided, extending forward under the seat from the front edge of the platform.

The seat suspension of the present chair may of course be adjustable to allow the seat to be mounted in forward, reverse, and/or flat positions. It is however envisaged that the seat will normally be in the forward-facing position, at any rate during times when it may be desired to carry a second child on the platform. A handle may be provided, in the form of a cross-bar between the two side frames, for the second child to hold. Alternatively, the top rear edge of the seat may be used for this purpose.

Retaining means, such as a strap, may be provided for retaining a standing child and/or an upright shopping bag on the platform. The strap can conveniently have a seat-belt type fastening.

Most of the developments of and variations on the basic chair design (including those noted above) may of course be employed with the present chair. If the chair is a multiple chair with the seats are mounted one behind the other, the platform will be located below and behind the rear seat; if there are 2 or more seats side by side, there may be a corresponding number of platforms, one behind each seat.

A push-chair embodying the present invention will now be described, by way of example, with reference to the drawings, in which:

FIG. 1 is a diagrammatic view of the chair;

FIG. 2 is a side view of a modification of the chair;

Figure 3:
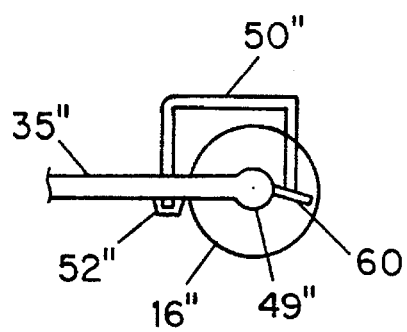
FIG. 3 is partial a side view of a modification of FIG. 2.

Referring to FIG. 1, the push-chair comprises a framework 10 on which a seat 11 is suspended. The framework consists of a pair of delta-shaped side frames 12, 13 stabilized and held together by cross-bars; one of the cross-bars forms a handle 14, and the others are concealed by the top and bottom edges of the seat 11. The seat 11 has a roughly rectangular base, a roughly rectangular back, and two roughly triangular sides, and is attached to the side frames at attachment points 18.

The side frame 12 has two small diameter wheels 15, 16 mounted near its lower corners; two further small diameter wheels (only one of which, 17, is shown) are similarly carried by the side frame 13. The front wheels 15, 17 are castor mounted, being carried on short horizontal arms extending from vertical pivot shafts attached to the side frames.

Side frame 12 consists of a pair of bars 25 and 26 hinged together at a hinge 27, a bar 28 hinged to the bar 25, and a bar 29 hinged to the bar 26 and the bar 28. In use, the bars 25 and 26 are aligned to form a single side of the side frame; the hinge 27 may include locking means (not shown) to maintain the two bars in alignment (with the angie between bars 25 and 26 being 180°). The bars 25, 26, and 28 all extend beyond the corners of the delta.

Either or both of the rear wheels may have a conventional brake (not shown); if both rear wheels have brakes, they may be coupled together by a brake coupling rod (not shown) extending across the chair. Such brakes normally include foot-operable brake levers.

For storage, the locks are released and the two bars 25 and 26 are turned or pivoted relative to each other to bring the hinge 27 upwards and to the left, i.e. away from to the point at which bar 29 is hinged to bar 28. This, of course, results in the bars 28 and 29 turning as well. The bar lengths and hinge points are such that this allows the four bars to collapse into substantial alignment (with the angle between bars 25 and 26 being 0°). The various components of the seat 11 are linked together so that they also fold up when the chair is folded up.

As described so far, the chair is broadly conventional.

At the bottom end of the bar 28 and the corresponding bar of the side frame 13, there is mounted a horizontal platform 35 which extends transversely across the width of the chair. The front edge of this platform is supported by a pair of straps 36, 37. Strap 36 extends from the front left corner of platform 35 to the bar 29; strap 37 extends from the front right corner of the platform to the corresponding bar of the side frame 13. The two rear wheels, wheel 16 of the side frame 12 and the corresponding wheel of the side frame 13, are mounted near to the rear corners of the platform 35, which can, as shown, conveniently extend back beyond the ends of the bars 28.

The front edge of the platform 35 is positioned approximately vertically below the rear upper edge 38 of the seat 11. The bar 25, and the corresponding bar in the side frame 13, extend upward and backward from this rear upper edge 38 to locate the handle 14 appropriately. This handle 14 is positioned to satisfy three requirements. First, it is located far enough back to allow a person pushing it to take a reasonable stride without striking the platform 35; second, it is located far enough back to allow a child to stand on the platform 35 with its head and chest projecting up between the bar 25 and the corresponding bar in the side frame 13; and third, it is located at a comfortable height for pushing. To achieve these three objectives, it may be desirable for the bar 25, and the corresponding bar in the side frame 13, to be curved as shown.

With this arrangement, a small child may be carried in the seat 11, and a second child may be carried in a standing position on the platform 35. The second, standing child will hold onto the rear upper edge 38 of the seat 11 or the side frames 12 end 13. This seat must be suitably positioned on the framework 10 so that this rear upper edge is at a suitable height above the platform 35.

The chair may be provided with a hood or cover (not shown) of generally conventional form. Such a hood or cover is preferably large enough to cover both the seat 11 (with any child which may be seated therein) and child standing on the platform 35.

The platform 35 may alternatively be used to carry a shopping bag, 39 of a vertical, and preferably self-supporting, form.

If desired, a strap (not shown) may be provided, attached to the bar 28 and the corresponding bar in the side frame 13 (or to the bars 25), to retain a standing child or a shopping bag on the platform 35. Such a strap would obviously have to be located at a height which would retain either a child or a shopping bag on the platform 35; a suitable location is close to the point at which the bar 28 is hinged to the bar 25.

It is important that the chair should have good stability; in particular, it should not tip over even in the worst loading condition (which is a child standing on the platform 35 but without a child in the seat 11). For this, the centre of gravity of the load should be inside the wheelbase 40 between the front and rear wheels. To achieve good stability, the rear edge of the platform 35 should not extend appreciably back beyond the axles of the rear wheel 16 and the corresponding wheel on the side frame 13. If desired, these rear wheels may be carried on trailing arms (not shown) which extend back beyond the rear edge of the platform 35.

FIG. 2 shows a modification of the FIG. 1 chair; corresponding components are given corresponding references with added primes.

This chair incorporates additional locking means; for convenience, several such locking means are shown, although in practice it is unlikely that all of them would be used together. A pair of rods 45 and 46, hinged to the bars 26' and 28' as shown, and hinged togehter to reach a slightly over-centre position at which they lock to hold the chair in the position shown. The bar 25' carries a spring-loaded hook 30 which engages automatically with a pin near the upper end of the bar 26' when the bar 26' is rotated about the hinge 27' into the position shown, so locking the bars 25' and 26' together. Also, the bar 25' carries a locking element 31 near its lower end, which can be slid down the bar 25' to engage with the bar 26' and lock it into the position shown.

The platform 35' has a raised front rim 47; if desired, side rails 51 can also be provided, as shown. It is hinged to the lower end of the bar 28' of the side frame 12', and its front end is coupled to the bar 28' by a spring 48. (The platform is connected to the other side frame in the same manner.) This spring 48, and the corresopnding one on the other side, form a spring suspension for the platform and seat. (If desired, the spring 48 can be replaced by a fixed strut, resulting in the platform being attached rigidly to the rest of the chair).

The bar 25' has an auxiliary bar 32 attached to it as shown, and the front end of the bar 29' projects out beyond the bar 26' as shown. The crossbars (not shown) to which the seat 11 is attached extend one between the bars 32 of the two side frames at attachment points 37' and the other between the ends of the bars 29' of the two side frames at attachment points 18'. This results in the seat being located further forward than shown in FIG. 1, thus effectively increasing the room available for a shopping bag or child standing on the platform 35'.

A cranked lever 50, pivoted at a pivot mounting 52 attached below the platform 35', forms a foot-operated brake lever. The running wheel 16 has a toothed cogwheel 49 attached to it, and the cranked lever 50 can be moved to bring its lower right end into engagement between the teeth of this cogwheel, so locking the wheel 16' against rotation. The brake lever is operated by means of its upper arm. The pivot on which this brake lever is mounted forms a brake coupling rod passing across the chair, and has a further lever attached to its other end engaging with a similar cogwheel attached to the opposite running wheel. The two rear running wheels are thus both locked by the same lever. The brake coupling rod is located under the platform 35', so that a child on the platform 35' cannot interfere with the operation of the brakes.

FIG. 3 shows a modification of the brake control mechanism of FIG. 2. The wheel 16" is in fact in this form a pair of wheel discs, with a brake device 49" located between them, end the drawing shows a side view of the brake control mechanism, with one of the two discs removed for clarity. This brake mechanism is closer to the conventional brake mechanism but is arranged, like the mechanism of FIG. 2, so that the brakes are applied to the wheels on both sides of the push-chair at once, and so that the brakes are unlikely to be operated accidentally, eg when going up or down curbs.

The brake device 49" has an operating lever 60, and a rod 50" has its lower end engaged with the arm 60. The rod 50" extends vertically from the end of the lever 60 and is bent horizontally to pass across the upper edge of the inner wheel disc of wheel 16", then backwards and then downwards to bring it to the level of the bracket 52". It is then bent to pass through the bracket and so across the width of the chair to the opposite rear wheel of the chair, where it is bent to form a mirror-image of its shape on the first side of the chair. If desired, the portion passing across the width of the chair may be further cranked to lie further underneath the platform 35".

Figure 4:
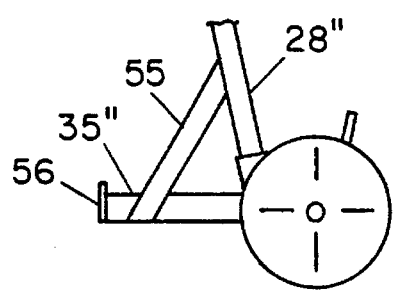
FIG. 4 is a partial side view of a further modification of FIG. 2.

FIG. 4 shows a modification to the platform of FIG. 2. The platform 35" is attached rigidly to the bar 28" at its rear edge, and two struts 55 (one each side) are attached rigidly to the platfarm 35" and the bars 28". The platform also has an upwards lip 56 at its front edge.

Figure 5A:
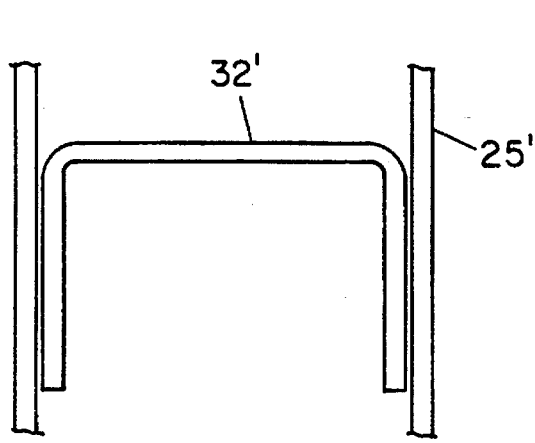
FIGS. 5 and 5A are partial side and front views respectively of a still further modification of FIG. 2.
Figure 5:
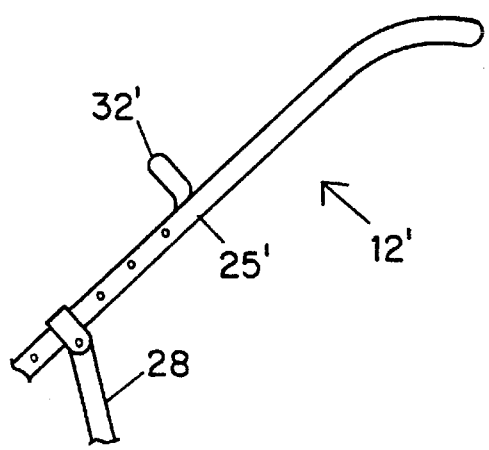

FIGS. 5 and 5A show a modified form of the auxiliary bars 32 of FIG. 2. In FIGS. 5 and 5A, there is a single auxiliary bar 32' having its ends lying parallel to and attached to the bars 25', and having its central portion bent to lie forward of those bars and across the chair.

I claim:

1. A push-chair for transporting a first child and a second child, comprising:

a frame to which is attached front and rear wheels and a seat for the first child;

a platform on which the second child can stand disposed at a lower rear position on the frame and including a substantially unobstructed trailing edge, the rear wheels being mounted adjacent the trailing edge of the platform; and means for mounting the seat to the frame at a position substantially forward of the platform;

wherein a substantially unobstructed space is formed above the platform and behind the seat, and whereby the second child can step onto and off the platform.

2. A push-chair according to claim 1, wherein the frame includes a pair of delta-shaped side frames, each including a front sloping bar intersecting and attached to a rear sloping bar and a horizontal bar intersecting and attached to both the front and rear sloping bars, wherein the platform is mounted on lower ends of the rear sloping bars.

3. A push-chair according to claim 2, wherein the support frame includes auxiliary bars forwardly mounted on upper portions of the front sloping bars, wherein the seat mounting means are supported on forward projections of the horizontal bars projecting beyond the front sloping bars and on the auxiliary bars.

4. A push-chair according to claim 2, wherein the platform is mounted rigidly to the rear sloping bars.

5. A push-chair according to claim 2, wherein the platform is spring-mounted to the rear sloping bars.

6. A push-chair according to claim 1 wherein each of the rear wheels has a lever-operated braking mechanism, the push-chair further comprising a coupling rod rotatably coupled to each braking mechanism by linkage means and located forward of axles of the rear wheels and below the platform.

* * * * *

(12) EX PARTE REEXAMINATION CERTIFICATE (9716th)
United States Patent
Fairclough

(10) Number: US 5,622,375 C1
(45) Certificate Issued: Jun. 26, 2013

(54) PUSH-CHAIR

(76) Inventor: Albert T. Fairclough, Farnborough (GB)

Reexamination Request:
No. 90/011,187, Aug. 25, 2010

Reexamination Certificate for:
Patent No.: 5,622,375
Issued: Apr. 22, 1997
Appl. No.: 08/307,703
Filed: Nov. 22, 1994

(21) Appl. No.: 90/011,187

(22) PCT Filed: Jan. 25, 1994

(86) PCT No.: PCT/GB94/00138
§ 371 (c)(1),
(2), (4) Date: Nov. 22, 1994

(87) PCT Pub. No.: WO94/16929
PCT Pub. Date: Aug. 4, 1994

(51) Int. Cl.
*B62B 9/28* (2006.01)
*B62B 9/26* (2006.01)
*B62B 9/00* (2006.01)
*B62B 5/00* (2006.01)
*B62B 5/08* (2006.01)

(52) U.S. Cl.
USPC .................. 280/642; 280/47.38; 280/658

(58) Field of Classification Search
None
See application file for complete search history.

(56) References Cited

To view the complete listing of prior art documents cited during the proceeding for Reexamination Control Number 90/011,187, please refer to the USPTO's public Patent Application Information Retrieval (PAIR) system under the Display References tab.

*Primary Examiner* — Peter C. English

(57) ABSTRACT

A push-chair consists of two delta-shaped side frames and connected by cross bars with a seat attached between the side frames, and with wheels at the bottom ends of the side frame bars. A transverse platform is provided at its lower rear, with the rear wheels mounted substantially at the trailing edge of the platform. The seat is forward of the platform, so that a second child can be carried on the platform, in a standing position behind the seat. Alternatively, a shopping bag can be carried vertically on the platform.

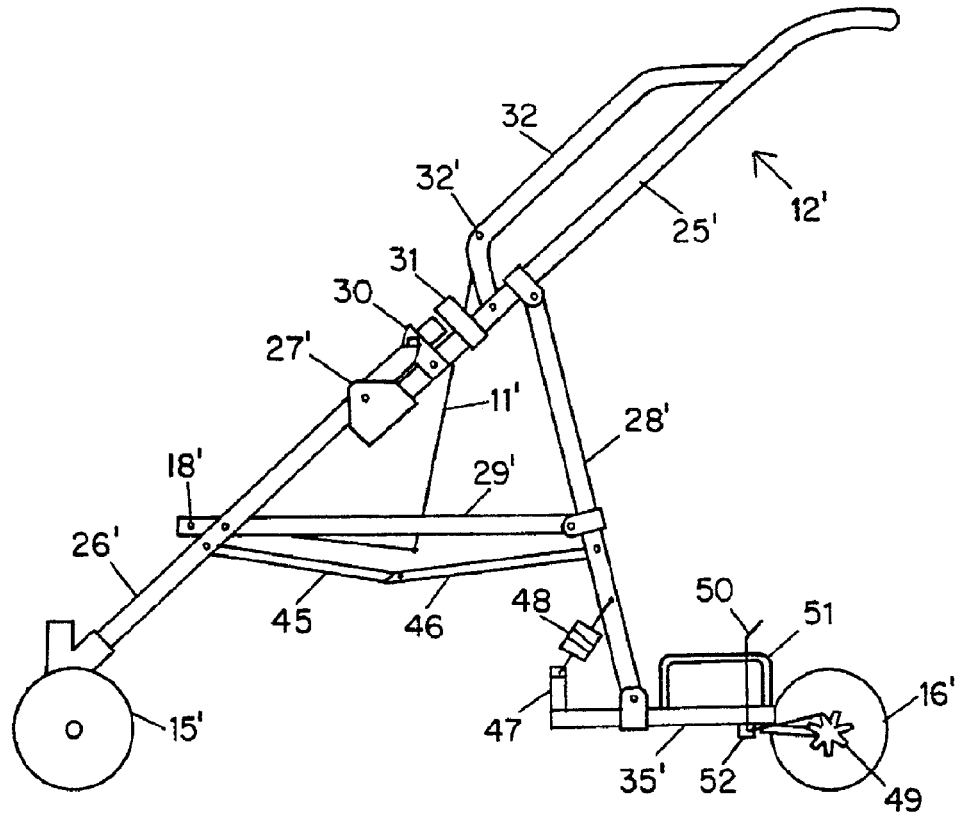

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5 and 6 is confirmed.

Claims 2 and 4 are cancelled.

Claim 3 is determined to be patentable as amended.

Claim 1 was not reexamined.

3. A push-chair [according to claim 2,] *for transporting a first child and a second child, comprising:*

*a frame to which is attached front and rear wheels and a seat for the first child;*

*a platform, on which the second child can stand, disposed at a lower rear position on the frame and including a substantially unobstructed trailing edge, the rear wheels being mounted adjacent the trailing edge of the platform;*

*means for mounting the seat to the frame at a position substantially forward of the platform;*

*wherein a substantially unobstructed space is formed above the platform and behind the seat, and whereby the second child can step onto and off the platform;*

*wherein the frame includes a pair of delta-shaped side frames, each including a front sloping bar intersecting and attached to a rear sloping bar and a horizontal bar intersecting and attached to both the front and rear sloping bars, wherein the platform is mounted on lower ends of the rear sloping bars; and* wherein the support frame includes auxiliary bars forwardly mounted on upper portions of the front sloping bars, wherein the seat mounting means are supported on forward projections of the horizontal bars projecting beyond the front sloping bars and on the auxiliary bars.

* * * * *